May 20, 1952 H. FRENCH 2,597,630
SIGNAL SHAPING CIRCUITS AND METHOD
Filed July 29, 1950
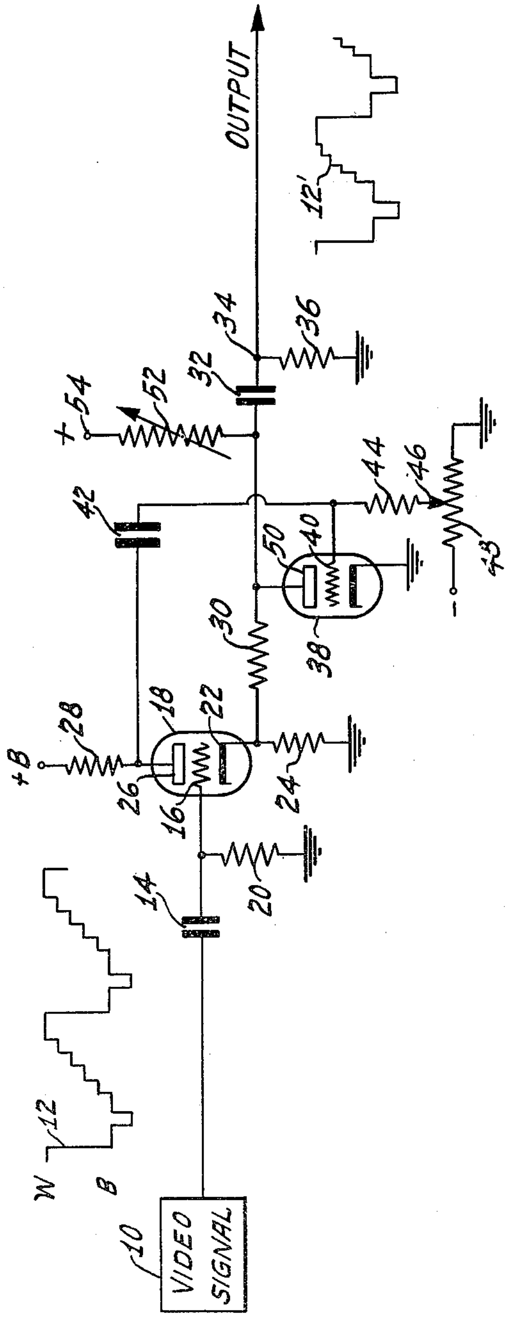
INVENTOR
Hubert French
BY
[signature]
ATTORNEY Patented May 20, 1952

2,597,630

UNITED STATES PATENT OFFICE 2,597,630

SIGNAL SHAPING CIRCUITS AND METHOD

Hubert French, Brooklyn, N. Y., assignor to Radio Corporation of America, a corporation of Delaware Application July 29, 1950, Serial No. 176,718

1 Claim. (Cl. 179—171)

The present invention relates to improvements in signal processing circuits and methods and more particularly, although not necessarily exclusively, to electrical circuits for correcting the wave form characteristics of communications signals.

More directly, the present invention relates to signal correction amplifiers for use in television systems to correct the overall brightness-transfer characteristic of the television channel in which the correction circuit is placed. Such correction amplifiers have in the prior art been sometimes referred to as gamma correction amplifiers.

In the communications art it often becomes necessary to alter or reshape existing electrical signals into forms more suitable for the particular purpose or need at hand. Sometimes electrical signals in passing through electronic amplifiers actually suffer distortion which must later be corrected before the signal becomes useful.

By way of example, consideration may be given to video signals found in the television art. It is well known that one extremity of video signal excusion corresponds to black or dark picture information while the other and opposite extremity corresponds to white or light picture information. The video signal representative of a uniform grey scale or light wedge used in photographic work will generally take the form of a signal having linear increments of amplitude between two potential levels. Arbitrarily, such a video signal may represent white picture information by low amplitude levels while depicting black picture information by high amplitude levels relative to some fixed datum.

It can then be seen that should this signal suffer electrical compression at either of its extremities due to unfortunate amplifier characteristics, the linearity of the signal will be destroyed and the resulting picture information defined by the signal will no longer be a faithful reproduction of the original scene, or in this case, the grey scale.

The need for amplitude correction amplifiers in the television art is quite fully discussed in an article entitled "Gamma and Range in Television" by I. G. Maloff appearing in the RCA Review for April 1939.

One of the outstanding characteristics of a good number of prior art gamma correction circuits is their sensitivity to small variations in amplitude of the applied signal. Since most gamma correction circuits take the form of compression or expander type amplifiers which operate only upon predetermined amplitude ranges of incoming signal, the precise amount of wave-form correction is obviously rendered a function of input signal amplitude.

It is therefore an object of the present invention to provide a novel form of gamma correction circuit which is simple in form and is less sensitive to amplitude variations in applied signals than some prior art systems.

It is another object of the present invention to provide a general shaping circuit for electrical signals which provides a predetermined amount of correction which is substantially independent of small variations in applied signal amplitude.

In the realization of the above objects and features and advantages, the present invention processes an electrical signal as follows. First, a threshold level is established with respect to some potential datum. The incoming wave form or signal excursions that fall on one side of this threshold level are then compressed. Means are then provided for displacing the position of the threshold level from its normal position in direct accordance with the average variations of peak amplitude excursions reached by the incoming wave form.

A more complete understanding of the present invention, as well as other objects and features of advantage may be obtained through a reading of the following description, especially when taken in connection with the single figure in which is shown one form of the present invention as applied to a gamma correction circuit for video signals.

Turning now to the drawing there is shown by block form at 10 a source of video signal. The source 10 may be an image orthicon camera, iconoscope, flying spot scanner, or any other video signal generating device. The video signal generated by the source 10 may be of the sync positive or sync negative variety. For purposes of discussion, it will be assumed that the signal generated will be of the sync negative variety, as illustrated by the wave form 12. The video signal 12 is coupled by a capacitor 14 to the grid 16 of the amplifier tube 18. The tube 18 may be of the triode variety as indicated. Resistor 20 provides cathode return path for the grid. The cathode 22 of the tube 18 is, in turn, connected with ground through the cathode resistor 24. The anode 26 of the amplifier tube is supplied with +B potential by means of the resistor 28. The circuit thus far described may be thought of as a typical cathode follower type amplifier. In accordance with the present invention, the output signal of the gamma correction circuit is derived from the cathode of the discharge tube 18 through a resistance 30 and capacitor 32. The output signal is made available at the output terminal 34 which is, in turn, connected with ground through resistor 36. In further accordance with the present invention, a unilateral conduction device 38 is connected from the right hand side of resistor 30 to ground. The unilateral device, has, by way of example, been shown as another triode. The grid 40 of the triode is in further accord with the present invention supplied with a phase inverted version of the input signal 12 by means of the coupling capacitor 42 connected with the anode of tube 18. A grid resistance 44 is supplied for the grid 40 so that grid current self biasing of the tube may be obtained. Adjustment of the bias on grid 40 is further permitted through the positioning of tap 46 of the potentiometer 48. The left hand terminal of potentiometer 48 is connected with a negative source of bias potential, while the right hand terminal is connected with ground. The anode 50 of the triode 38 may be provided with positive biasing potential by the rheostat 52, which is connected between the anode 50 and a source of positive potential 54.

The operation of the invention is substantially as follows. As the input signal of the grid 16 of tube 18 swings more positively with respect to ground, the signal developed across the cathode resistor 24 will also swing more positively with respect to ground. The unilateral conduction device 38 in the form of a triode is biased to cut off over part of the signal which is repeated by the tube 18 and applied to the grid 40.

One of the novel features of the present invention is the biasing of the triode 38 by means of a phase inverted version of the video signal 12, as stated above. The grid 40 receives positive going sync which sets up a net negative bias on the grid 40 in accordance with the amplitude of the incoming signal. Thus, should the incoming signal drop in amplitude, the bias developed on the grid 40 of the discharge tube 38 will be reduced and the threshold value at which conduction of the tube 38 begins will be also reduced. The portion of the signal applied to the grid 40, which is more positive than the cut off point of the tube 38, established by grid current self biasing, as stated above, causes the tube 38 to conduct thereby to cause a voltage drop across the resistor 30. This, in effect, expands the negative going portion of the incoming signal as the point of connection between anode 50 and the resistor 30 is more negative in accordance with the more positive portion of the signal repeated from the anode 26 to the grid 40. This may be regarded as relative compression of the positive going portion of the input video signal 12.

The degree of compression and the particular characteristics of the compression may of course be adjusted by controlling the rheostat 52 or the potentiometer 48. In one form of the present invention the rheostat 52 may be omitted and only the positive bias provided by the drop across resistor 24 employed. Still further, the present invention contemplates the omission of the fixed negative bias supply for the triode 38. Thus, the potentiometer 48 may be replaced by a simple variable resistance connected from the grid 40 to ground.

Although the present invention has been illustrated in connection with video signals, it is obvious that it is actually in no way limited thereto. Moreover, in some instances, it may be desirable to invert the polarity of applied video signals to that of sync positive signals. In other instances, it is useful to provide well known means for maintaining or establishing DC picture information at the grid of the amplifier tube 18. Obviously, the triodes 18 and 38 may be replaced by other suitable devices, either of the vacuum tube, gaseous or crystal variety.

Having thus described my invention, what is claimed is:

In a television signal processing channel a combination of a supply terminal at which conditionally appears a television signal and a first electron discharge tube having at least an anode, a cathode and control electrode, said television signal having recurring maximum peaks, a connection from said supply terminal to the control electrode of the first electron discharge tube, a resistance connected from said first electron discharge tube anode to a positive potential terminal, a resistance connected from said first electron discharge tube cathode to a negative potential terminal, a second electron discharge tube having at least a cathode, an anode and a control electrode, a resistance directly connected from said first electron discharge tube cathode to said second electron discharge tube anode, a resistance connected from said second electron discharge tube control electrode to a negative power supply terminal, a capacitor connected between said first electron discharge tube anode and said second electron discharge tube control electrode, said last named capacitance and resistance providing for cutoff of said second named tube substantially at times other than upon occurrence of said peaks, and an output circuit connected with said second electron discharge tube anode.

HUBERT FRENCH.

REFERENCES CITED

The following references are of record in the file of this patent:

UNITED STATES PATENTS

| Number | Name | Date |
|---|---|---|
| 2,237,407 | Bruck | Apr. 8, 1941 |
| 2,266,531 | Bedford | Dec. 16, 1941 |
| 2,383,420 | Scoles | Aug. 21, 1945 |
| 2,517,586 | Moe | Aug. 18, 1950 |

FOREIGN PATENTS

| Number | Country | Date |
|---|---|---|
| 218,237 | Switzerland | Mar. 16, 1942 |